(12) United States Patent
Fujimura

(10) Patent No.: US 7,782,382 B2
(45) Date of Patent: Aug. 24, 2010

(54) DIGITAL CAMERA

(75) Inventor: Yuichi Fujimura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 572 days.

(21) Appl. No.: 11/649,312

(22) Filed: Jan. 4, 2007

(65) Prior Publication Data

US 2007/0153110 A1    Jul. 5, 2007

(30) Foreign Application Priority Data

Jan. 5, 2006    (JP) ............................. 2006-000873

(51) Int. Cl.
*H04N 5/222*    (2006.01)
*G09G 5/00*    (2006.01)
(52) U.S. Cl. ...................... 348/302; 348/305; 348/312; 345/4; 345/5; 345/6
(58) Field of Classification Search ............ 348/333.01, 348/333.02, 333.12; 345/4, 5, 6; 396/373, 396/374
See application file for complete search history.

(56) References Cited

U.S. PATENT DOCUMENTS

| | | | | |
|---|---|---|---|---|
| 4,829,365 A | * | 5/1989 | Eichenlaub | 348/54 |
| 5,825,436 A | * | 10/1998 | Knight | 349/16 |
| 5,926,154 A | * | 7/1999 | Hirono et al. | 345/5 |
| 6,611,243 B1 | * | 8/2003 | Moseley et al. | 345/4 |
| 7,205,959 B2 | * | 4/2007 | Henriksson | 345/4 |
| 2004/0183934 A1 | * | 9/2004 | Tatamiya | 348/333.02 |
| 2004/0218245 A1 | * | 11/2004 | Kean et al. | 359/232 |
| 2004/0239582 A1 | * | 12/2004 | Seymour | 345/5 |
| 2005/0046951 A1 | * | 3/2005 | Sugihara et al. | 359/619 |
| 2005/0248503 A1 | * | 11/2005 | Schobben et al. | 345/7 |
| 2006/0279528 A1 | * | 12/2006 | Schobben et al. | 345/156 |
| 2007/0013624 A1 | * | 1/2007 | Bourhill | 345/84 |
| 2007/0035565 A1 | * | 2/2007 | Kerofsky | 345/690 |
| 2007/0229695 A1 | * | 10/2007 | Kato | 348/333.12 |
| 2007/0296874 A1 | * | 12/2007 | Yoshimoto et al. | 348/739 |
| 2008/0001847 A1 | * | 1/2008 | Kratchounova et al. | 345/1.1 |
| 2008/0001849 A1 | * | 1/2008 | Jin et al. | 345/4 |
| 2009/0040426 A1 | * | 2/2009 | Mather et al. | 349/65 |

FOREIGN PATENT DOCUMENTS

| | | |
|---|---|---|
| JP | 2000-137443 | 5/2000 |
| JP | 2001-69397 | 3/2001 |
| JP | 2001-211368 | 8/2001 |
| JP | 2002-281353 | 9/2002 |
| JP | 2004-280052 | 10/2004 |

OTHER PUBLICATIONS

Japanese Office Action dated Jun. 2, 2010 (with English translation).

* cited by examiner

*Primary Examiner*—David L Ometz
*Assistant Examiner*—Richard M Bemben
(74) *Attorney, Agent, or Firm*—McGinn IP Law Group, PLLC

(57) ABSTRACT

First pixels and second pixels are arranged in an LCD of a digital camera. Image light from the first pixel is diffused by a diffusing filter. Image light from the second pixel is deflected by a prism and directed in an oblique direction. When the LCD is viewed from a forward direction, only a captured image generated by the first pixels is observed. When the LCD is viewed from the oblique direction, the captured image, and camera information generated by the second pixels are observed in a state that they overlap each other.

3 Claims, 7 Drawing Sheets

DIGITAL CAMERA

BACKGROUND OF THE INVENTION

1. Field of the Invention

The present invention relates to a digital camera which records captured images as digital image data.

2. Description Related to the Prior Art

Digital cameras are well known, and record subject images as digital image data to a data storage. The digital cameras have a display device such as a liquid crystal display (LCD) for displaying various images. The display device displays a through image of a subject at the time of framing, and camera information such as remaining battery charge, number of available recording frames, a shooting condition and the like over the through image. When the camera information is displayed over the through image, part of the through image is replaced by the camera information, and therefore the thorough image cannot be viewed clearly and appropriately.

Such problem can be solved by providing a sub display device in addition to a main display device, and displaying camera information on the sub display device, as disclosed in Japanese Patent Laid-Open Publication No. 2001-69397. Such problem can also be solved by displaying camera information over a through image only when the display of the camera information is directed by an operation button, as disclosed in Japanese Patent Laid-Open Publication No. 2001-211368.

In the publication JP-A-2001-69397, however, providing two display devices raises production costs. In the publication JP-A-2001-211368, the operation for switching display and nondisplay of the camera information is troublesome.

SUMMARY OF THE INVENTION

It is a primary object of the present invention to provide a digital camera which facilitates camera information checking, and assures visibility of a through image.

It is another object of the present invention to provide a digital camera which improves visibility of a through image at low costs.

In order to achieve the above and other objects, a digital camera of the present invention includes a display device and a display controller. The display device displays a first image which is viewed from a first direction and a second image which is viewed from a second direction that is different from the first direction on a display surface. The display controller directs the display device to display a captured image as the first image and camera information of the digital camera as the second image.

It is preferable that the first direction is a direction substantially perpendicular to the display surface and the second direction is a downward, upward or lateral oblique direction to the display surface.

It is preferable that the display device has a liquid crystal panel in which first pixels and second pixels are arranged. The first pixels preferably display the first image and the second pixels preferably display the second image.

The first pixels and the second pixels are preferably arranged with a ratio of 2:1.

The first pixels are viewable from the oblique direction as well. Therefore, when the first image is viewed from the oblique direction, the first image preferably overlaps the second image and appears darker than the second image.

It is preferable that a diffusing filter is disposed in front of or behind each of the first pixels. The diffusing filter transmits light to the perpendicular direction as it is. At the same time, the diffusing filter transmits light to the oblique direction while attenuating the luminous intensity of the light. Moreover, a prism is preferably disposed in front of each of the second pixels and deflects incident light in the oblique direction.

It is also preferable that a light-shielding plate is disposed in front of or behind each of the second pixels. The light-shielding plate is formed longitudinally or laterally shorter than the second pixel and disposed such that its upper or side edge coincides with an upper or side edge of the second pixel. The light-shielding plate blocks light transmitted to or from the second pixel which proceeds toward the perpendicular direction and a direction symmetric to the oblique direction with respect to the perpendicular direction.

It is also preferable that a switching liquid crystal element is disposed in front of or behind each of the second pixels. The switching liquid crystal element is formed longitudinally or laterally shorter than the second pixel and disposed such that its upper or side edge coincides with an upper or side edge of the second pixel. The switching liquid crystal element blocks light transmitted to or from the second pixel which proceeds toward the perpendicular direction and a direction symmetric to the oblique direction with respect to the perpendicular direction when turned on. The switching liquid crystal element transmits the light as it is when turned off.

When the switching liquid crystal elements are turned off, both the first pixels and the second pixels preferably display the captured image.

The camera information preferably includes at least one of remaining battery charge, number of available recording frames and a shooting condition.

It is preferable that the digital camera further includes a display switchover device for switching between the first image and the second image.

According to the present invention, the captured image and the camera information can be viewed on the identical display surface by changing the viewing direction between the first and second directions. Owing to this, the camera information can be easily observed. In addition, only the captured image becomes observable depending on the viewing direction. Owing to this, it is prevented that the visibility of the captured image is lowered when overlapped by the camera information. Moreover, the captured image and the camera information are displayed on one display device, and therefore production cost is reduced as compared to the digital camera with two display devices.

BRIEF DESCRIPTION OF THE DRAWINGS

The above objects and advantages of the present invention will become more apparent from the following detailed description when read in connection with the accompanying drawings, in which:

FIG. 8A and FIG. 8B are sectional views of yet another LCD, illustrating image light illuminated from each first and second pixel, in which FIG. 8A shows a state that switching liquid crystal elements are turned on and FIG. 8B shows a state that the switching liquid crystal elements are turned off.

DETAILED DESCRIPTION OF THE PREFERRED EMBODIMENTS

Figure 1:
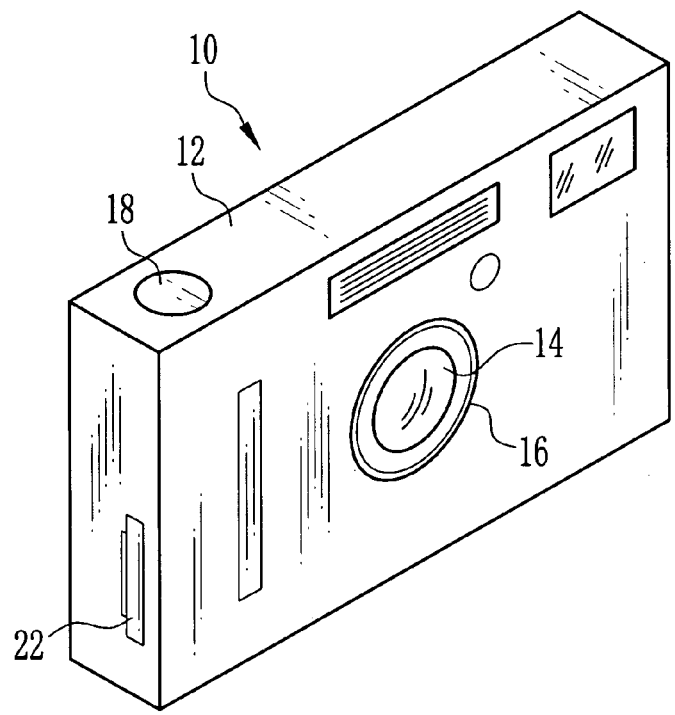
FIG. 1 is a perspective view illustrating a front side of a digital camera.

In FIG. 1, a digital camera 10 according to the present invention has a camera body 12 with a substantially rectangular parallelepiped shape. At a front surface of the camera body 12, a lens barrel 16 holding a taking lens unit 14 is disposed. At a top surface of the camera body 12, a shutter button 18 is disposed, and at a side surface of the camera body 12, a memory card slot (not shown) to which a memory card 20 (see, FIG. 3) is detachably connected and a lid 22 for closing the memory card slot are disposed. When the digital camera 10 is set to an image capture mode and the shutter button 18 is depressed, an image capturing operation is executed, and then a captured image is recorded in the memory card 20.

Figure 2:
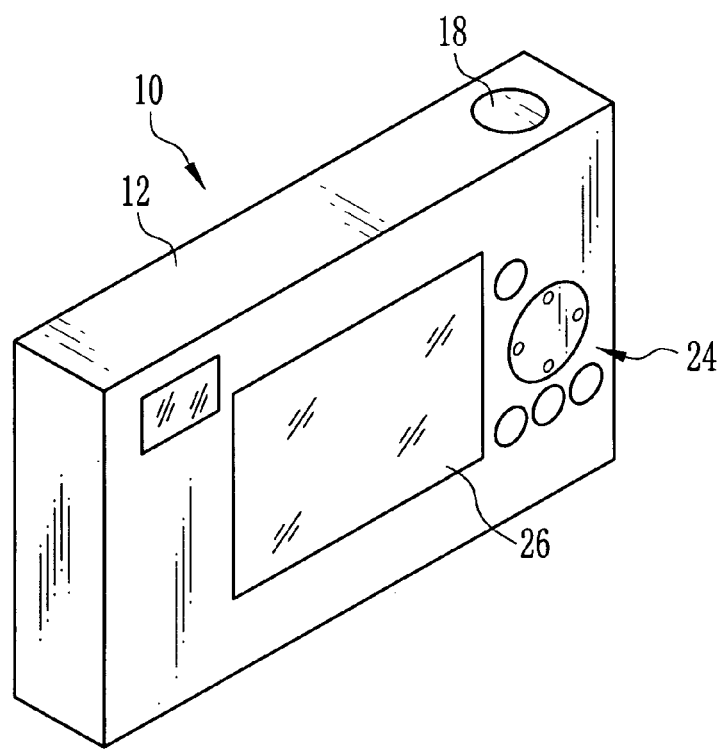
FIG. 2 is a perspective view illustrating a rear side of the digital camera.

In FIG. 2, an operating section 24 and an LCD 26 are disposed on a rear surface of the camera body 12. The operating section 24 is composed of a mode selection button for selecting one of the image capture mode, a playback mode and a menu mode, a zoom button for varying a zoom magnification, a cursor key for moving a cursor, and the like.

The LCD 26 displays a through image of a subject in the image capture mode, an image recorded in the memory card 20 in the playback mode, and a setup screen for making various settings in the menu mode. On the LCD 26, it is possible to observe only the through image, or to observe the through image and camera information including remaining battery charge, number of available recording frames and a shooting condition on an identical screen, by changing the viewing direction.

Figure 3:
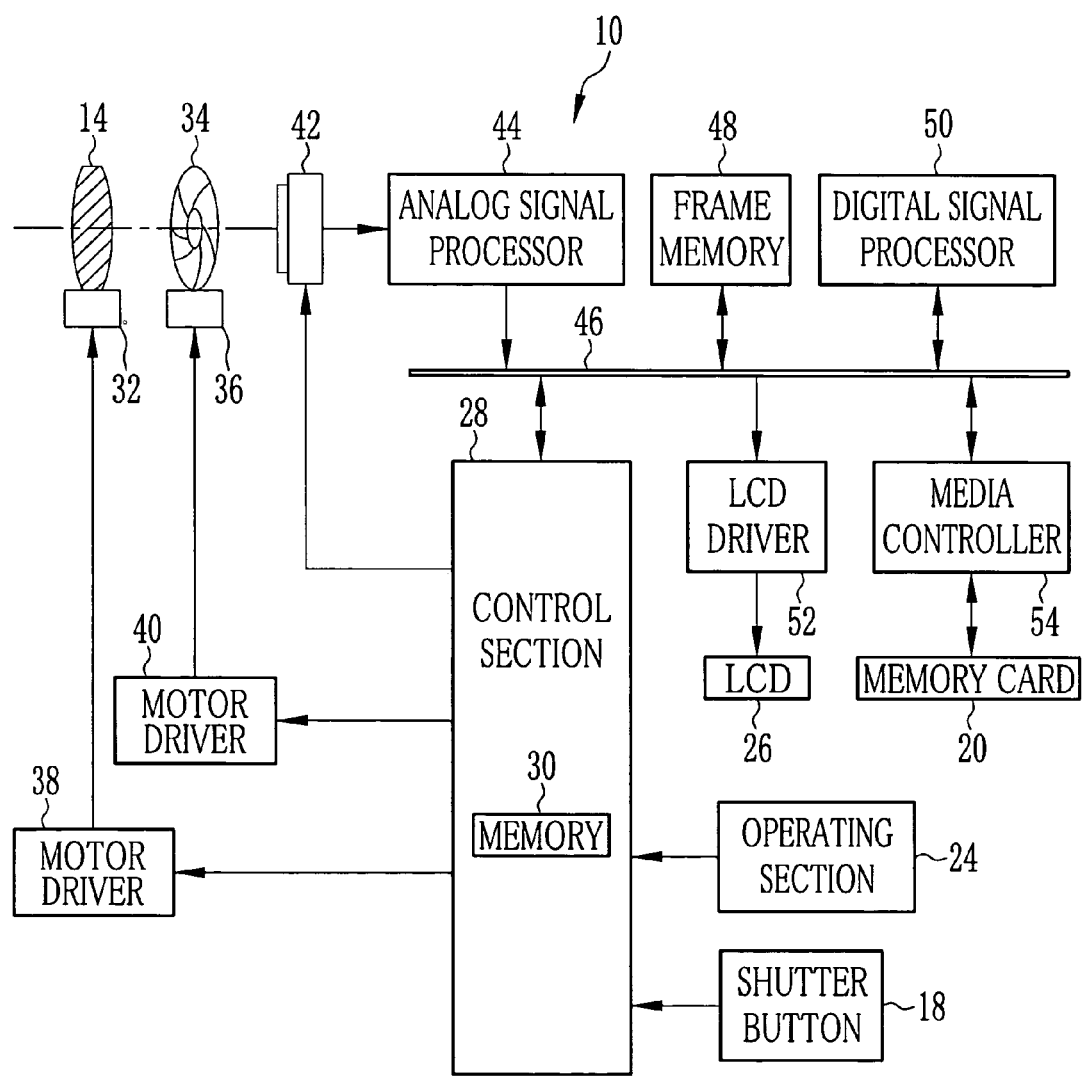
FIG. 3 is a block diagram illustrating an electrical structure of the digital camera.

In FIG. 3, a control section 28 is disposed inside the digital camera 10. The control section 28 controls each component of the digital camera 10 based on a control program stored in a memory 30. Besides the control program, an image processing program, and various data such as a current shooting condition and setup information are stored in the memory 30.

The taking lens unit 14 is composed of a zoom lens for varying the optical zoom magnification and a focus lens for focus adjustment, and driven by a lens drive mechanism 32 including a motor. An aperture stop 34 adjusts the aperture size when it is driven by an aperture drive mechanism 36 including a motor. The lens drive mechanism 32 and the aperture drive mechanism 36 are controlled by the control section 28 through motor drivers 38 and 40, respectively.

Behind the taking lens unit 14, a CCD 42 is located. As well known, the CCD 42 has a plurality of photoelectric conversion elements which generate and accumulate an electrical charge corresponding to the amount of light received, and outputs an image signal photoelectrically converted from the light of a subject. The CCD 42 starts capturing a through image when the digital camera 10 is set to the image capture mode. Once the shutter button 18 is depressed during the through image capturing, the CCD 42 temporarily stops the through image capturing and captures a principal image for recording.

The image signal output from the CCD 42 is input to an analog signal processor 44. The analog signal processor 44 has, as is known, a correlation double sampling circuit (CDS), an amplifier (AMP) and an A/D converter (A/D) (none of them shown). In the analog signal processor 44, the image signal is filtered for noise reduction and amplified, and then converted into digital image data. The digital image data is input to a frame memory 48 through a data bus 46.

The frame memory 48 temporarily stores image data output from the analog signal processor 44. The frame memory 48 is a work memory for a digital signal processor 50. The digital signal processor 50 applies various image processing, such as gradation conversion, white balance correction, γ correction and the like, to the image data in the frame memory 48. The processed image data is displayed on the LCD 26 via an LCD driver 52 if it is the through image data. Alternatively, the processed image data is sent to a JPEG compression circuit (not shown) if it is the principal image data, and is recorded in the memory card 20 via a media controller 54.

Figure 4:
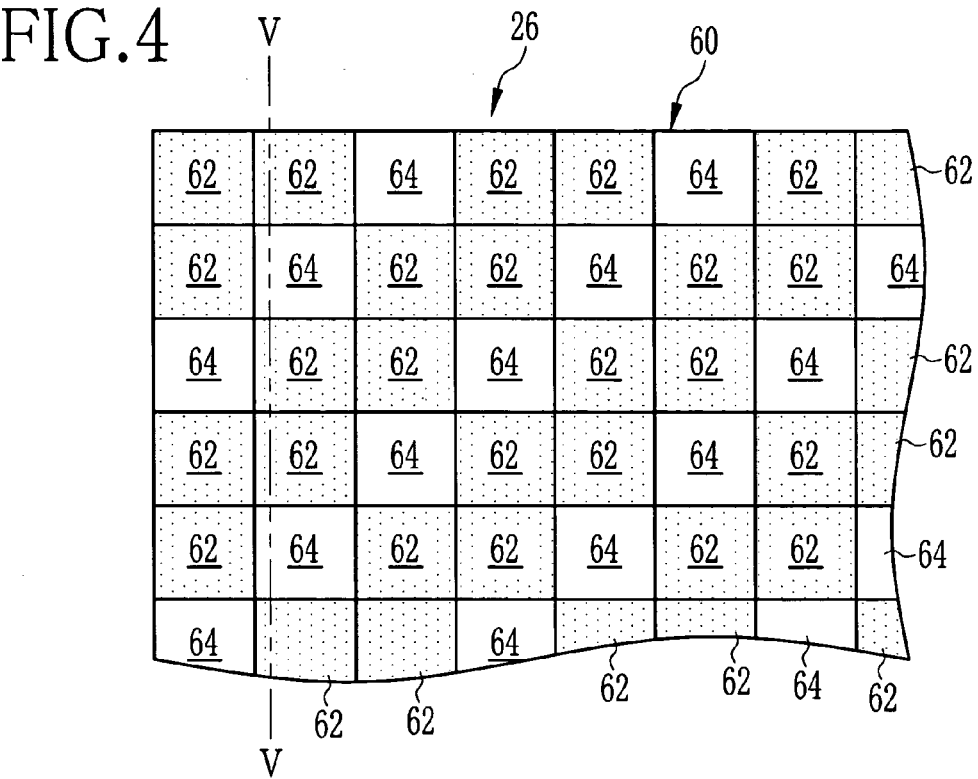
FIG. 4 is a plan view of an LCD.

As shown, in FIG. 4, the LCD 26 has a liquid crystal panel 60 in which liquid crystal molecules are enclosed. The liquid crystal panel 60 has first pixels 62 and second pixels 64 arranged therein. Each of the first and second pixels 62 and 64 is driven by a driving signal from the LCD driver 52, and alters the light transmission rate by changing the orientation of the liquid crystal molecules. In the preset embodiment, the first pixels 62 and the second pixels 64 are arranged with a ratio of 2:1, however the ratio thereof can be changed as appropriate. The arrangement pattern of the first and second pixels 62 and 64 may be changed from the pattern shown in FIG. 4.

Figure 5:
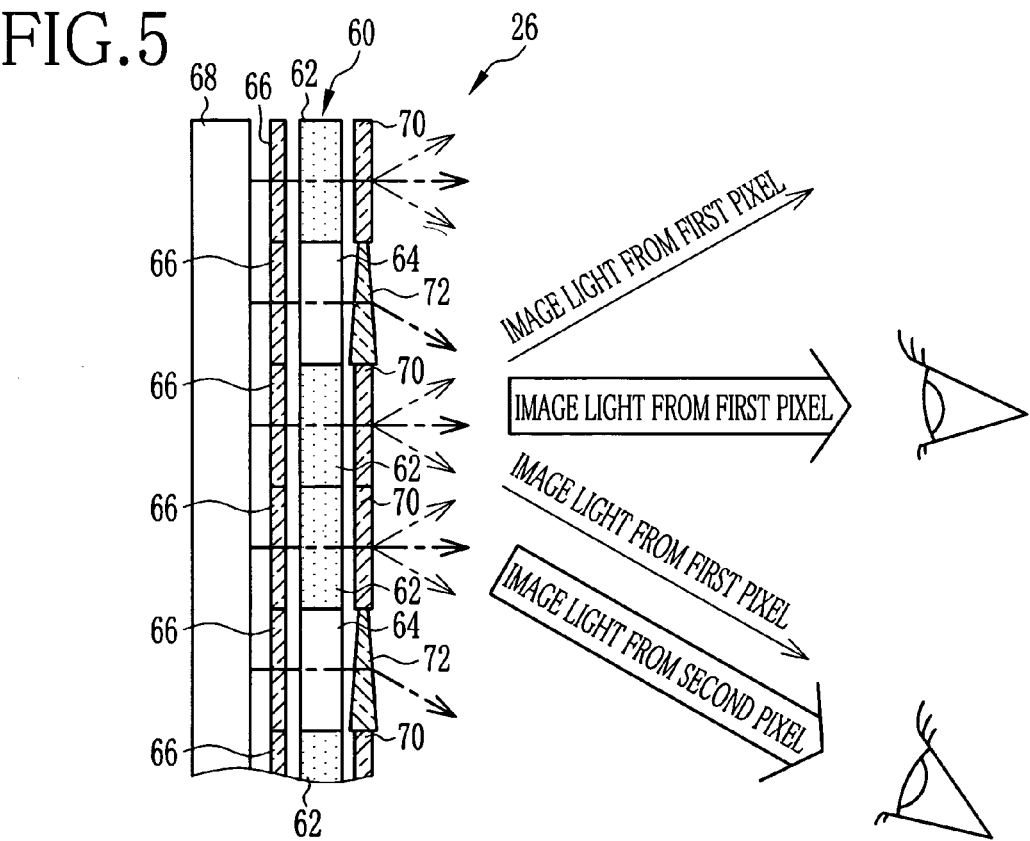
FIG. 5 is a sectional view along the line V-V of FIG. 4, illustrating image light illuminated from each first and second pixel.

In FIG. 5, one of RGB color filters 66 is disposed behind each pixel 62 and 64. Behind the color filters 66, a backlight 68 is located. Light from the backlight 68 is converted into light of R, G or B color by the color filters 66 and then enters the first and second pixels 62 and 64. Each of the first and second pixels 62 and 64 controls the light transmission rate, and thereby producing an image light having density gradation in each RGB color.

A diffusing filter 70 is located in front of each first pixel 62, and a prism 72 is located in front of each second pixel 64. The image light passed through the first pixels 62 enters the diffusing filters 70. The diffusing filters 70 diffuse the image light within a predetermined angular range around a center line perpendicular to a display surface of the LCD 26. The image light from the diffusing filters 70 is transmitted with maximum luminous intensity in the direction perpendicular to the display surface. The luminous intensity of the image light becomes lower as angular difference from the perpendicular direction becomes larger.

The image light passed through the second pixels 64 enters the prisms 72. The prisms 72 deflect the image light downward or upward. In the present embodiment, the image light is deflected downward and emanated. Note that the image light may also be deflected sideways.

For this configuration, a first image generated by the first pixels 62 can be viewed from the direction perpendicular to the display surface of the LCD 26. A second image generated by the second pixels 64 can be viewed from the downward oblique direction to the display surface of the LCD 26.

The image light of the first image generated by the first pixels 62 is also diffused downward on the rear side of the camera body 12 even though its luminous intensity is lowered. Therefore, the first image can be observed along with the second image generated by the second pixels 64 when the LCD 26 is viewed from the downward direction. At this time, the first image is displayed with lower density (brightness) than the second image.

The control section 28 drives the first and second pixels 62 and 64 through the LCD driver 52 to generate images. Under the control of the control section 28, the first pixels 62 generate a through image in the image capture mode, the image recorded in the memory card 20 in the playback mode, or the setup screen image in the setup mode. In addition, the control section 28 checks the supply voltage in the image capture mode to measure the remaining battery charge. Moreover, the control section 28 accesses the memory card 20 to detect the number of available recording frames. Furthermore, the control section 28 refers the memory 30 to detect the shooting condition. Owing to this, the control section 28 drives the second pixels 64 to generate the detected camera information.

Figure 6A:
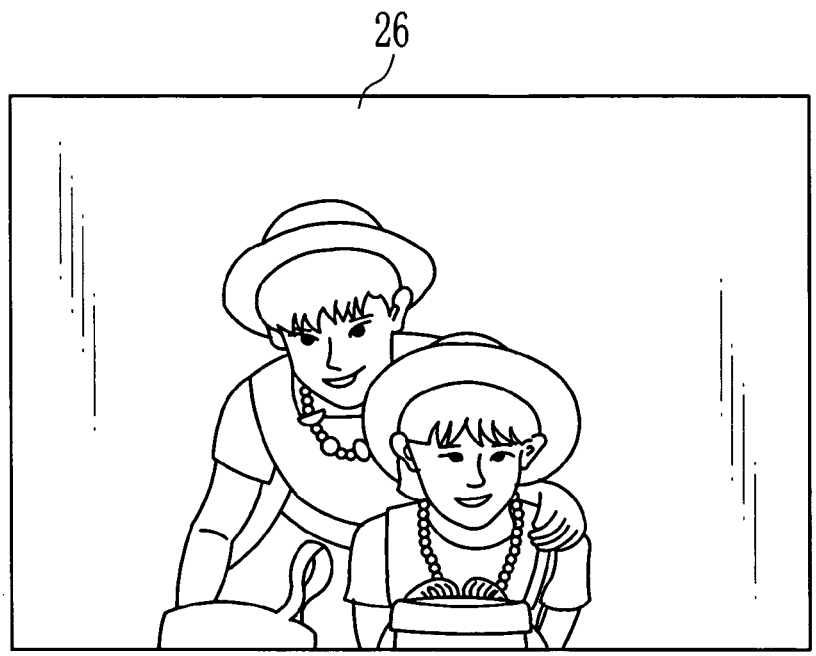
FIG. 6A is an explanatory view illustrating the LCD viewed from a forward direction in an image capture mode.
Figure 6B:
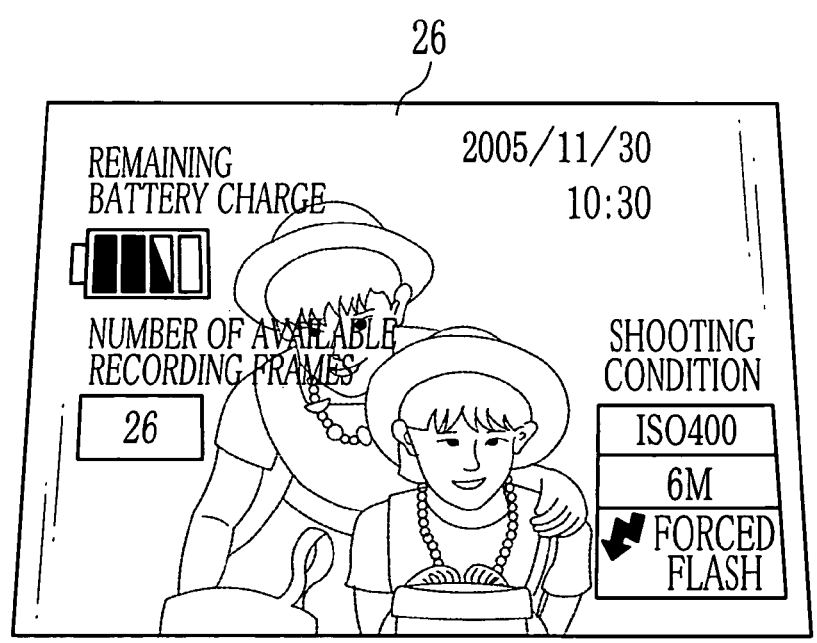
FIG. 6B is an explanatory view illustrating the LCD viewed from a downward oblique direction in the image capture mode.

As shown in FIG. 6A, in the image capture mode, the through image can be observed when the LCD 26 is viewed from the forward direction. Similarly, the image recorded in the memory card 20 can be observed in the playback mode, and the setup screen can be observed in the setup mode when the LCD 26 is viewed from the forward direction. As shown in FIG. 6B, in the image capture mode, the camera information and the through image having lower brightness can be observed when the LCD 26 is viewed from the downward oblique direction.

According to the present invention, only the through image can be observed depending on the viewing direction of the LCD 26. Owing to this, the through image can be viewed clearly and appropriately. Moreover, since the camera information can be easily observed on the identical screen of the through image by changing the viewing angle to the LCD 26, it is convenient. If the camera information is displayed over the through image, it has conventionally been necessary to display the camera information small near the edge of the screen. According to the present invention, however, there is no need to display the camera information near the edge of the screen. Therefore, images and characters of the camera information can be displayed large, and large amount of information can be included in the camera information. In addition, according to the present invention, it is possible to reduce production costs as compared to the conventional digital cameras having plural LCDs for displaying the through image and the camera information separately.

In the above embodiment, the prisms are used to emanate the image light from the second pixels in the downward direction of the rear surface of the camera body, however, the present invention is not limited to this. For example, light-shielding plates 82 may be used to emanate the image light from the second pixels 64 in the downward direction of the rear surface of the camera body 12, like an LCD 80 shown in FIG. 7. Note that the components identical to those of the first embodiment are denoted by the same reference numerals in FIGS. 7, 8A, 8B and 9, and descriptions thereof are omitted.

Figure 7:
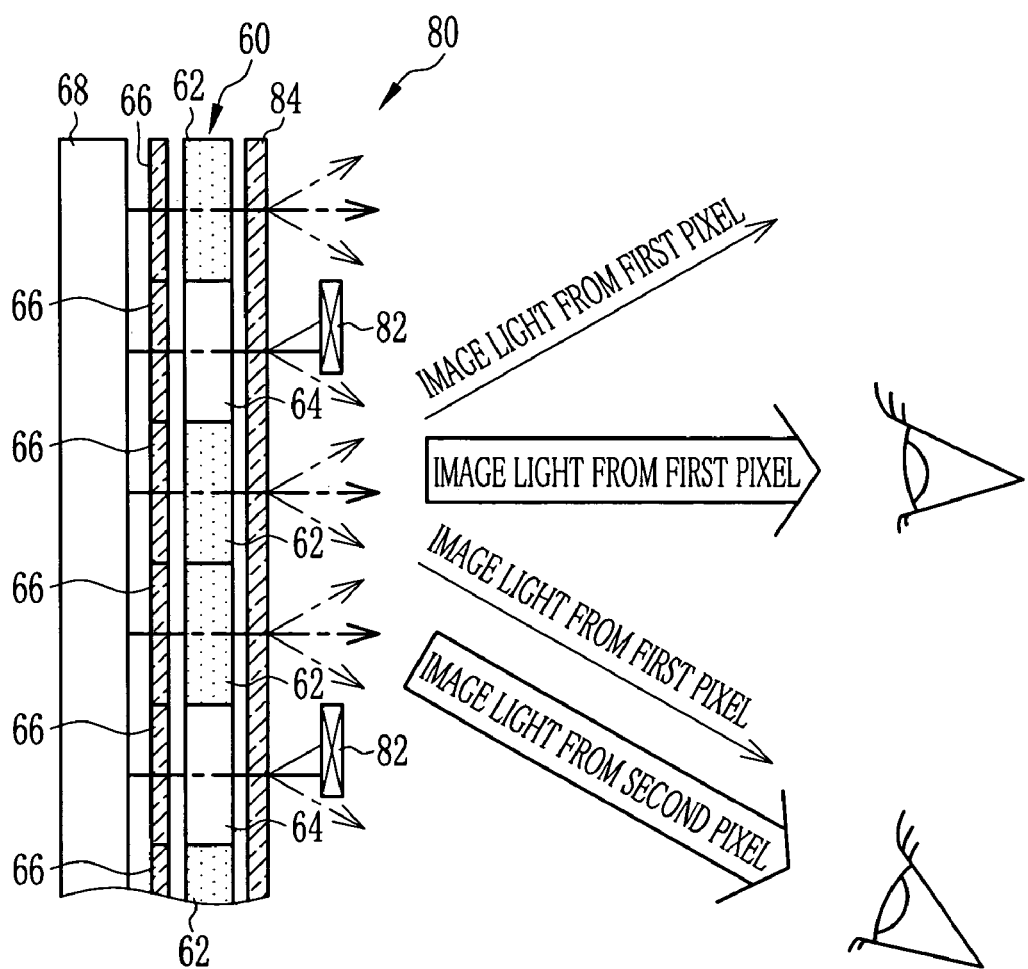
FIG. 7 is a sectional view of another LCD, illustrating image light illuminated from each first and second pixel.

In FIG. 7, a diffusing filter 84 is disposed in front of the liquid crystal panel 60 of the LCD 80. The diffusing filter 84 is disposed over a whole front surface of the liquid crystal panel 60, and diffuses the image light from the first and second pixels 62 and 64 within a predetermined angular around a center line perpendicular to a display surface of the LCD 80.

The light-shielding plate 82 is located in front of each second pixel 64. Each light-shielding plate 82 is shorter than the second pixel 64 and disposed such that its upper edge coincides with an upper edge of the second pixel 64. Each light-shielding plate 82 blocks a part of the image light from the second pixel 64 that proceeds to the area above the perpendicular line to the display surface of the LCD 80. Owing to this, the image light from the second pixels 64 is emanated in the downward direction of the rear surface of the camera body 12.

Figure 8A:
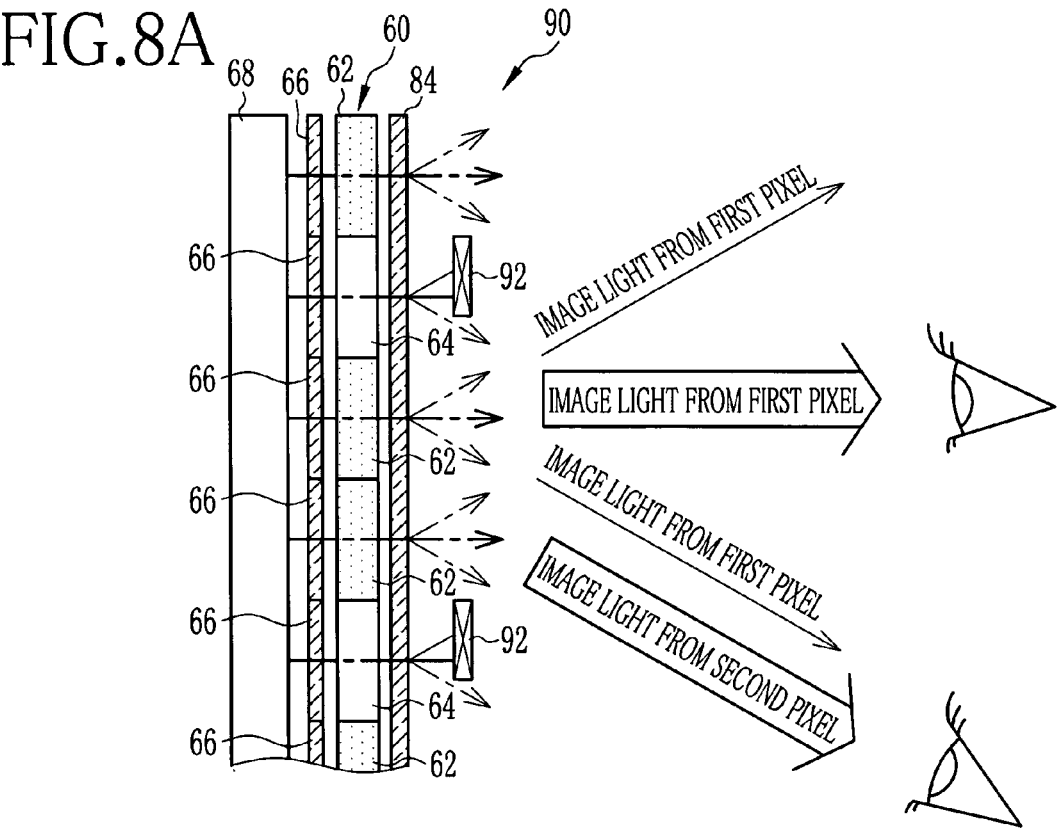
Figure 8B:
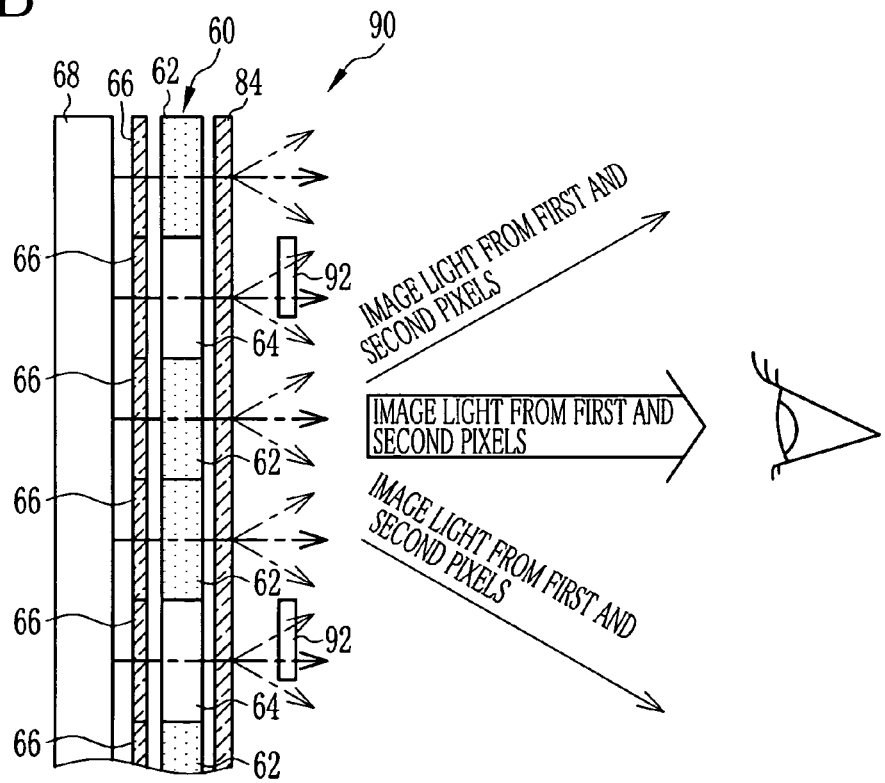
Figure 9:
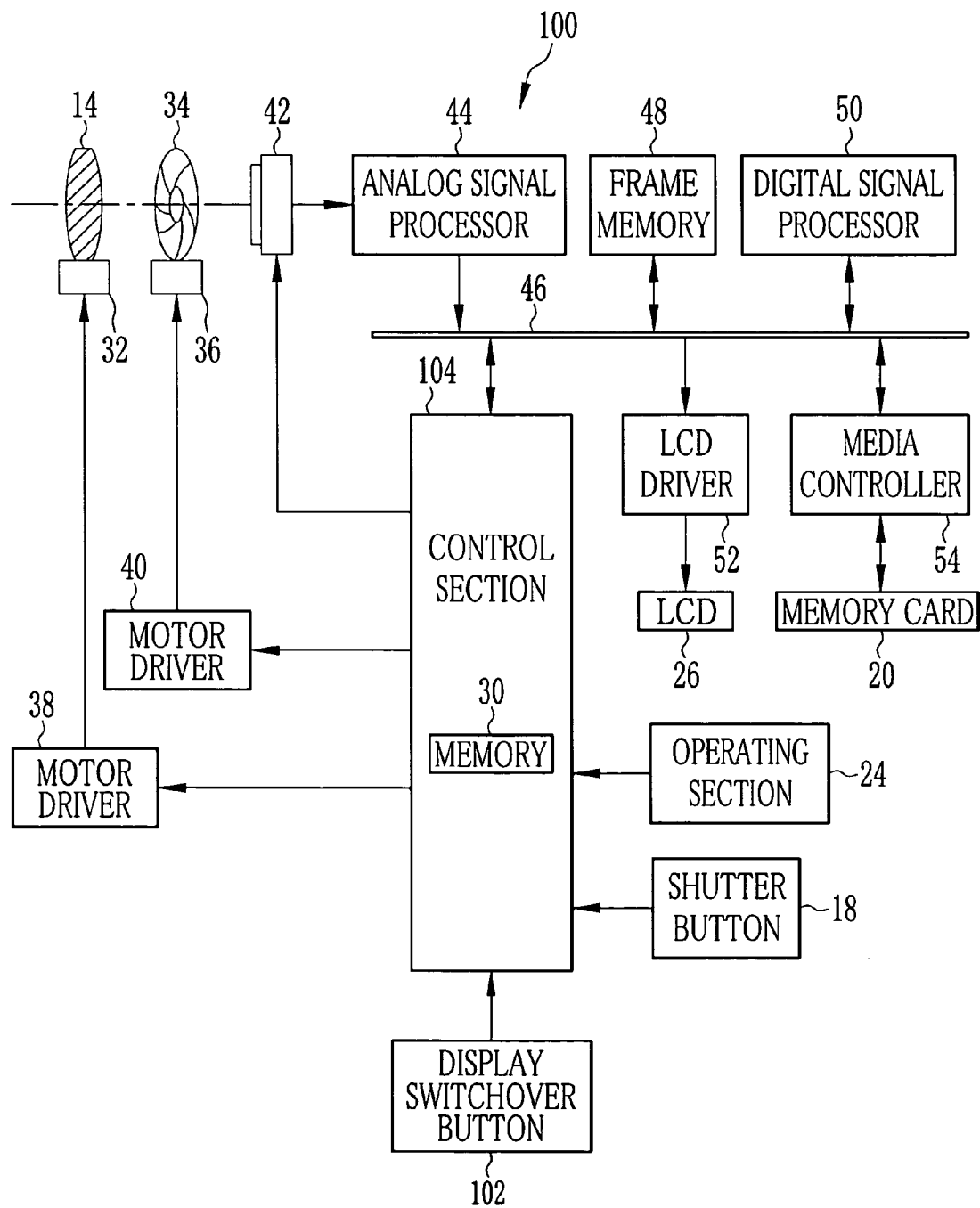
FIG. 9 is a block diagram illustrating an electrical structure of a digital camera according to another embodiment.

In addition, switching liquid crystal elements 92 may be used instead of the light-shielding plates 82, like an LCD 90 shown in FIGS. 8A and 8B. The switching liquid crystal elements 92 are disposed in the same manner as the light-shielding plates 82.

The switching liquid crystal elements 92 are turned on and off under the control of the control section 28. When turned on, each switching liquid crystal element 92 blocks a part of the image light from the second pixel 64 that proceeds to the area above the perpendicular line to a display surface of the LCD 90, as shown in FIG. 8A. When turned off, each switching liquid crystal element 92 transmits the image light passed through the second pixels 64 as it is, as shown in FIG. 8B. When the switching liquid crystal elements 92 are turned on, the same effect as the above embodiment can be obtained in the LCD 90.

In the LCD 90, when the switching liquid crystal elements 92 are turned off, the image light from the second pixels 64 is not blocked, but diffused within a predetermined angular range around the center line perpendicular to the display surface of the LCD 90, like the image light from the first pixels 62. Accordingly, when the switching liquid crystal elements 92 are turned off, it is possible to generate a high-resolution image by using both the first and second pixels 62 and 64.

In the above embodiments, the first pixels generate the through image and the second pixels generate the image of the camera information. However, the first pixels may generate the image of the camera information and the second pixels may generate the through image. In addition, it is also possible to provide a display switchover button 102, like a digital camera 100 shown in FIG. 9. In the digital camera 100, a first image generated by the first pixels 62 and a second image generated by the second pixels 64 are switched under the control of a control section 104 every time the display switchover button 102 is depressed.

In the above embodiments, the through image and the camera information are observed on the identical screen by changing the viewing direction or by operating the display changeover button in the image capture mode, however the present invention is not limited to this. For example, the image recorded in the memory card and the through image may be checked on the identical screen in the playback mode.

In the above embodiments, the image light from the second pixels is emanated in the downward direction of the rear surface of the camera body. However, the image light from the second pixels may be emanated, for example, in an upward or a lateral direction of the rear surface of the camera body. In addition, it is also possible to dispose the prisms, the light-shielding plates or the switching liquid crystal elements in front of the first pixels so as to control the emanation direction of the image light from the first pixels.

In the above embodiments, the through image having low brightness is displayed with the camera information, however, the present invention is not limited to this. For example, a dual-view LCD panel which is viewable only from two directions may be used. When using the dual-view LCD panel, the image light from the first pixels is emanated in the upward direction of the rear surface of the camera body and the image light from the second pixels is emanated in the downward direction of the same. For this configuration, the camera information and the through image can be viewed selectively without overlapping each other.

In the above embodiments, the present invention is applied to the digital camera with the LCD. However, the present invention can also be applied to, for example, the digital camera with other kinds of display device such as an organic light emitting display (OLED). The present invention may be applied to a digital camera incorporated in various devices such as a cell phone with camera.

Various changes and modifications are possible in the present invention and may be understood to be within the present invention.

What is claimed is:

1. A digital camera which captures an image of a subject, said digital camera comprising:
    a display device for displaying a first image viewed from a first direction and a second image viewed from a second direction that is different from said first direction on a display surface; and
    a display controller for directing said display device to display said captured image as said first image and camera information of said digital camera as said second image,
    wherein said first direction is a direction substantially perpendicular to said display surface and said second direction is a downward, upward or lateral oblique direction to said display surface,
    wherein said display device has a liquid crystal panel in which first pixels and second pixels are arranged, said first pixels displaying said first image and said second pixels displaying said second image, and
    wherein said first pixels are viewable from said oblique direction and when said first image is viewed from said oblique direction, said first image overlaps said second image and appears darker than said second image.

2. The digital camera according to claim 1, further comprising:
    a diffusing filter disposed in front of or behind each of said first pixels, said diffusing filter transmitting light to said perpendicular direction as it is, said diffusing filter transmitting light to said oblique direction while attenuating a luminous intensity of said light.

3. The digital camera described in claim 2, further comprising:
    a prism disposed in front of each of said second pixels, said prism deflecting incident light in said oblique direction.

* * * * *